United States Patent
Fan et al.

(10) Patent No.: US 10,897,526 B2
(45) Date of Patent: Jan. 19, 2021

(54) MOBILE PHONE

(71) Applicant: GUANGDONG OPPO MOBILE TELECOMMUNICATIONS CORP., LTD., Guangdong (CN)

(72) Inventors: Xiaoyu Fan, Dongguan (CN); Zhengshan Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/217,788

(22) Filed: Dec. 12, 2018

(65) Prior Publication Data

US 2019/0253542 A1 Aug. 15, 2019

(30) Foreign Application Priority Data

Feb. 9, 2018 (CN) .................... 2018 2 0244082 U

(51) Int. Cl.
H04M 1/02 (2006.01)

(52) U.S. Cl.
CPC ....... H04M 1/0264 (2013.01); H04M 1/0237 (2013.01)

(58) Field of Classification Search
CPC ............. H04M 1/0214; H04M 1/0264; H04M 1/0266; H04M 1/0268; H04M 1/0235;
(Continued)

(56) References Cited

U.S. PATENT DOCUMENTS

| 2009/0069059 A1* | 3/2009 | Min | H04M 1/0247 |
| | | | 455/575.4 |
| 2017/0223158 A1* | 8/2017 | Yin | H04M 1/02 |

(Continued)

FOREIGN PATENT DOCUMENTS

| CN | 202168120 U | 3/2012 |
| CN | 205320124 U | 6/2016 |

(Continued)

OTHER PUBLICATIONS

International Search Report in the international application No. PCT/CN2018/120364, dated Feb. 28, 2019.
(Continued)

*Primary Examiner* — George Eng
*Assistant Examiner* — Hung K Du

(57) ABSTRACT

A mobile phone includes a first middle frame, a second middle frame, a display screen, a rear cover and a camera assembly. The first middle frame includes a main bearing plate and a side peripheral edge. The second middle frame includes an auxiliary bearing plate and an outer peripheral edge. The auxiliary bearing plate forms a slidable connection with the main bearing plate. The auxiliary bearing plate has a first position and a second position relative to the main bearing plate. In the first position, the side peripheral edge is connected with the outer peripheral edge. In the second position, the side peripheral edge is spaced from the outer peripheral edge. The camera assembly is arranged on the auxiliary bearing plate. In the first position, the camera assembly is hidden in the mobile phone. In the second position, the camera assembly may be exposed.

20 Claims, 20 Drawing Sheets

(58) Field of Classification Search
CPC .............. H04M 1/0237; H04M 1/0245; H04M 1/0247; H04M 1/0272; H04M 1/72583; H04M 2250/20; H04M 2250/52; H04N 5/23238; H04N 5/2257; G06F 1/1641; G06F 1/1652; G06F 1/1677; G03B 17/04
See application file for complete search history.

(56) References Cited

U.S. PATENT DOCUMENTS

| | | |
|---|---|---|
| 2018/0007182 A1* | 1/2018 | Lin ...................... G06F 1/1652 |
| 2018/0205809 A1 | 7/2018 | Luo et al. |
| 2019/0014201 A1 | 1/2019 | Bao |
| 2019/0033926 A1* | 1/2019 | Huang .................. G06F 1/1686 |

FOREIGN PATENT DOCUMENTS

| | | |
|---|---|---|
| CN | 106790801 A | 5/2017 |
| CN | 106899721 A | 6/2017 |
| CN | 107071103 A | 8/2017 |
| CN | 108471493 A | 8/2018 |
| CN | 207968576 U | 10/2018 |
| EP | 3255867 A1 | 12/2017 |
| EP | 3396933 A1 | 10/2018 |
| WO | 2017008525 A1 | 1/2017 |

OTHER PUBLICATIONS

Written Opinion of the International Search Authority in the international application No. PCT/CN2018/120364, dated Feb. 28, 2019.
Supplementary European Search Report in the European application No. 18210411.7, dated Apr. 8, 2019.
Office Action of the Indian application No. 201914002283, dated Aug. 17, 2020.

* cited by examiner

MOBILE PHONE

CROSS-REFERENCE TO RELATED APPLICATION

The present application claims benefit of Chinese Patent Application No. 201820244082.8, filed on Feb. 9, 2018, the contents of which are hereby incorporated by reference in its entirety.

TECHNICAL FIELD

The disclosure relates to the technical field of mobile terminals, and particularly to a mobile phone.

BACKGROUND

At present, mobile terminals such as smart phones are all provided with cameras for providing video call and self-portrait functions and the like. A camera is required to occupy part of a space of a display panel of a mobile terminal, which may relatively reduce a display area of the display panel of the mobile terminal and is unfavorable for achievement of a high screen-to-body ratio required at present.

SUMMARY

Embodiments of the disclosure provide a mobile phone, so as to solve the problem that a camera occupies a space of a display screen and is unfavorable for increasing a screen-to-body ratio of the mobile phone.

A mobile phone may include a middle frame member, a display screen, a rear cover and a camera assembly.

The middle frame member may include a first middle frame and a second middle frame. The first middle frame may include a main bearing plate and a side peripheral edge. The main bearing plate may include a first lateral surface, a second lateral surface and four side edges, the first lateral surface and the second lateral surface are arranged opposite to each other. The side peripheral edge may be arranged on three side edges of the main bearing plate and may include a first side peripheral edge, a second side peripheral edge and a third side peripheral edge connected between the first and second side peripheral edges. The first side peripheral edge and the second side peripheral edge are arranged opposite to each other. The second middle frame may include an auxiliary bearing plate and an outer peripheral edge. The auxiliary bearing plate may include a first lateral surface, a second lateral surface and four side edges. The first lateral surface and the second lateral surface being arranged opposite to each other. The outer peripheral edge may be arranged on three side edges of the auxiliary bearing plate and may include a first outer peripheral edge, second outer peripheral edge and a third outer peripheral edge connected between the first and second outer peripheral edges. The first outer peripheral edge and the second outer peripheral edge are arranged opposite to each other. The side edge of the auxiliary bearing plate without the outer peripheral edge may form a slidable connection with the side edge of the main bearing plate without the side peripheral edge. The auxiliary bearing plate may have a first position and a second position relative to the main bearing plate. In the first position, the first side peripheral edge may be connected with the first outer peripheral edge and the second side peripheral edge may be connected with the second outer peripheral edge. In the second position, the first side peripheral edge may be spaced from the first outer peripheral edge and the second side peripheral edge may be spaced from the second outer peripheral edge.

The display screen may be positioned on the side of the main bearing plate on which the first lateral surface is positioned, and may be fixedly connected with the first, second and third side peripheral edges.

The rear cover may be positioned on the side of the main bearing plate on which the second lateral surface is positioned, and may be fixedly connected with the first, second and third side peripheral edges.

The camera assembly may be arranged on the auxiliary bearing plate. In the first position, the camera assembly may be hidden in the mobile phone. In the second position, the camera assembly may be exposed.

Other embodiments of the present disclosure also provide a mobile phone, which include a middle frame, a display screen, a rear cover, a rotating block and a camera assembly.

The middle frame member may have a first lateral surface and a second lateral surface arranged opposite to each other. The middle frame member may include a first middle frame and a second middle frame which are slideably arranged relative to each other. The first middle frame may have a main bearing plate, and the second middle frame may have an auxiliary bearing plate. The auxiliary bearing plate may have a first position and a second position relative to the main bearing plate.

The display screen may be positioned on the side of the main bearing plate on which the first lateral surface is positioned.

The rear cover may be positioned on the side of the main bearing plate on which the second lateral surface is positioned.

The rotating block may be rotatablely arranged on the auxiliary bearing plate. In the first position of the auxiliary bearing plate, the rotating block is not able to rotate relative to the auxiliary bearing plate. In the second position of the auxiliary bearing plate, the rotating block is able to rotate relative to the auxiliary bearing plate.

The camera assembly may be arranged on the rotating block on the auxiliary bearing plate; in the first position of the auxiliary bearing plate, the camera assembly is hidden in the mobile phone, and in the second position, the camera assembly is exposed.

According to the mobile phone of the present disclosure, the first middle frame and the second middle frame are slideably arranged relative to each other, the camera assembly is arranged on the second middle frame. Due to such arrangement, the second middle frame may be in the first position relative to the first middle frame when the camera assembly is not required to be used, and the second middle frame may be in the second position relative to the first middle frame when the camera assembly is required to be used. By such an arrangement, influence on realization of normal photographing and view finding functions of the camera assembly can be avoided, meanwhile, an arrangement space of the display screen can be prevented from being occupied and a screen-to-body ratio of the mobile phone can be increased.

BRIEF DESCRIPTION OF DRAWINGS

In order to describe the technical solutions in the embodiments of the disclosure or a conventional art more clearly, the drawings required to be used in descriptions about the embodiments will be introduced below. It is apparent that the drawings described below are only some embodiments of the disclosure. Other drawings may further be obtained by those of ordinary skill in the art according to these drawings without creative work.

DETAILED DESCRIPTION

Figure 1:
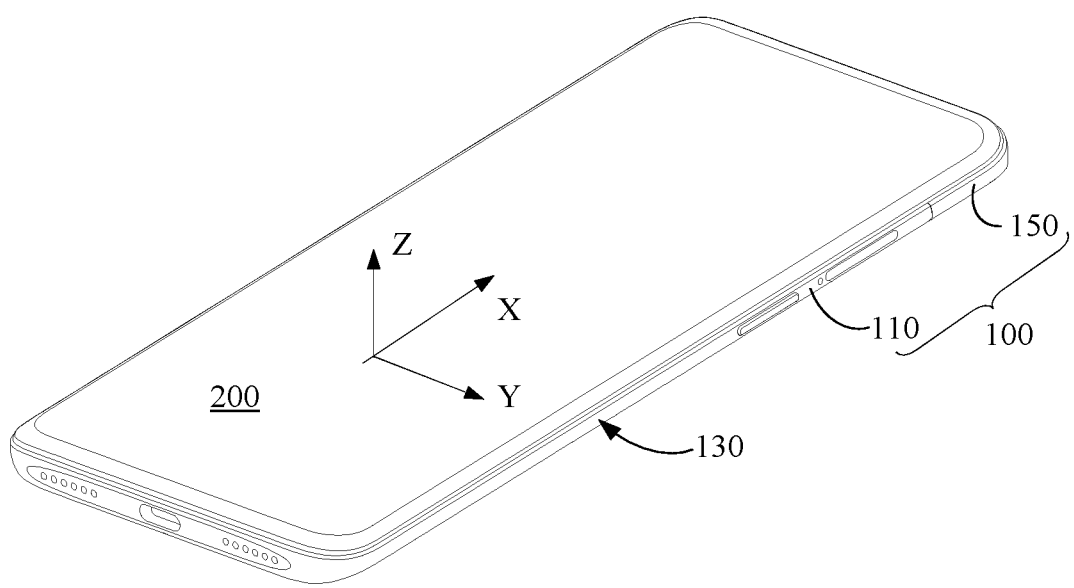
FIG. 1 illustrates a perspective view of a mobile terminal according to an embodiment from a viewing angle, in which a second middle frame in the mobile terminal is in a first position relative to a first middle frame.

In order to understand the present disclosure conveniently, the present disclosure will be described more comprehensively with reference to relevant accompanying drawings. Preferred embodiments of the disclosure are given in the accompanying drawings. However, the disclosure may be implemented in many different forms and is not limited to the embodiments described herein. On the contrary, providing these embodiments is to understand the disclosed content of the disclosure more thoroughly and comprehensively.

It is to be noted that, when a component is described as "fixed" on another component, it may be directly arranged on the other component or intervening elements may be present. When a component is considered as "connected" to another component, it may be directly connected to the other component or intervening elements may be present. Terms "left", "right" and similar expressions used in the disclosure are only adopted for description.

Unless otherwise defined, all technological and scientific terms used in the disclosure have meanings the same as those usually understood by those skilled in the art of the disclosure. In the disclosure, terms used in the description of the disclosure are only adopted to describe specific embodiments and not intended to limit the disclosure. Term "and/or" used in the disclosure includes one or any and all combinations of multiple related items which are listed.

A "communication terminal" (or called a "terminal" for short) used herein includes, but not limited to, a device arranged to receive/send a communication signal through a wired line connection (for example, through Public Switched Telephone Network (PSTN), Digital Subscriber Line (DSL), digital cable and direct cable connections and/or another data connection/network) and/or through a wireless interface (for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal). A communication terminal arranged to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver.

Embodiments of the present disclosure provide a mobile phone, which may include a middle frame member, a display screen, a rear cover and a camera assembly.

The middle frame member may include a first middle frame and a second middle frame. The first middle frame may include a main bearing plate and a side peripheral edge. The main bearing plate may include a first lateral surface, a second lateral surface and four side edges, the first lateral surface and the second lateral surface are arranged opposite to each other. The side peripheral edge may be arranged on three side edges of the main bearing plate and may include a first side peripheral edge, a second side peripheral edge and a third side peripheral edge connected between the first and second side peripheral edges. The first side peripheral edge and the second side peripheral edge are arranged opposite to each other. The second middle frame may include an auxiliary bearing plate and an outer peripheral edge. The auxiliary bearing plate may include a first lateral surface, a second lateral surface and four side edges. The first lateral surface and the second lateral surface being arranged opposite to each other. The outer peripheral edge may be arranged on three side edges of the auxiliary bearing plate and may include a first outer peripheral edge, second outer peripheral edge and a third outer peripheral edge connected between the first and second outer peripheral edges. The first outer peripheral edge and the second outer peripheral edge are arranged opposite to each other. The side edge of the auxiliary bearing plate without the outer peripheral edge may form a slidable connection with the side edge of the main bearing plate without the side peripheral edge. The auxiliary bearing plate may have a first position and a second position relative to the main bearing plate. In the first position, the first side peripheral edge may be connected with the first outer peripheral edge and the second side peripheral edge may be connected with the second outer peripheral edge. In the second position, the first side peripheral edge may be spaced from the first outer peripheral edge and the second side peripheral edge may be spaced from the second outer peripheral edge.

The display screen may be positioned on the side of the main bearing plate on which the first lateral surface is positioned, and may be fixedly connected with the first, second and third side peripheral edges.

The rear cover may be positioned on the side of the main bearing plate on which the second lateral surface is positioned, and may be fixedly connected with the first, second and third side peripheral edges.

The camera assembly may be arranged on the auxiliary bearing plate. In the first position, the camera assembly may be hidden in the mobile phone. In the second position, the camera assembly may be exposed.

In one embodiment, a height of the outer peripheral edge may be larger than a height of the auxiliary bearing plate.

In one embodiment, an edge of the display screen is provided with a stepped slot. When the auxiliary bearing plate is in the first position, part of a structure of the outer peripheral edge may be accommodated in the stepped slot.

In one embodiment, an edge of the rear cover is provided with a stepped slot. When the auxiliary bearing plate is in the first position, part of the structure of the outer peripheral edge may be accommodated in the stepped slot.

In one embodiment, a telephone receiver may be arranged on the auxiliary bearing plate. A telephone receiver slot may be formed in the third outer peripheral edge. When the auxiliary bearing plate is in the first position, the telephone receiver slot may be partially exposed to enable the telephone receiver to transmit sounds to the outside through the telephone receiver slot.

In one embodiment, the third outer peripheral edge may include a top surface, an outer surface and an inner surface. The inner surface may be connected between the top surface and the first lateral surface of the auxiliary bearing plate. A first boundary of the telephone receiver slot may be arc-shaped. A middle part of the first boundary may be flush with an intersection line of the top surface and the outer surface. Two end parts of the first boundary may be positioned on the top surface. A second boundary of the telephone receiver slot may be flush with the first lateral surface of the auxiliary bearing plate. When the auxiliary bearing plate is in the first position, the top surface of the third outer peripheral edge may be partially covered by the edge of the display screen and the middle part of the first boundary of the telephone receiver slot may be exposed.

In one embodiment, a height of the third outer peripheral edge may be larger than heights of the first and second outer peripheral edges. The height of the third outer peripheral edge at connecting positions with the first and second outer peripheral edges may gradually change to form arc-shaped transitions between an edge of the third outer peripheral edge and edges of the first and second outer peripheral edges.

In one embodiment, edges of the side peripheral edges are provided with decorative edges, and edges of the outer peripheral edge are also provided with decorative edges. In the first position, the decorative edges on the side peripheral edges are butted with the decorative edges on the outer peripheral edges.

In one embodiment, a buffer edge may be arranged at the edge the edge of on the display screen fixedly connected with the first, second and third side peripheral edges. The hardness of the buffer edge may be lower than hardness of a cover plate of the display screen.

In one embodiment, the third outer peripheral edge may protrude outwards in a direction far away from the first middle frame and is arc-shaped.

In one embodiment, a groove may be formed in the outer surface of the third outer peripheral edge. A microphone jack may be formed in the groove.

In one embodiment, the third side peripheral edge may protrude outwards in a direction far away from the second middle frame and is arc-shaped.

In one embodiment, a groove may be formed in an outer surface of the third side peripheral edge. A speaker jack may be formed in the groove.

In one embodiment, the camera assembly may include a front camera. An orientation of a light entering surface of the front camera may be the same as an orientation of the display screen.

In one embodiment, a protective cover plate may be arranged on the side of the auxiliary bearing plate on which the first lateral surface is positioned. A light permeable region corresponding to the front camera may be arranged on the protective cover plate.

In one embodiment, an edge of the protective cover plate may contact with the first outer peripheral edge, the second outer peripheral edge and the third outer peripheral edge.

In one embodiment, the camera assembly may further include a rear camera. An orientation of a light entering surface of the rear camera may be opposite to the orientation of the display screen.

In one embodiment, positions of the rear camera and the front camera on the auxiliary bearing plate may be mutually staggered.

In one embodiment, a protective cover plate may be arranged on the side of the auxiliary bearing plate on which the second lateral surface is positioned. A light permeable region corresponding to the rear camera may be arranged on the protective cover plate.

In one embodiment, an edge of the protective cover plate may contact with the first outer peripheral edge, the second outer peripheral edge and the third outer peripheral edge.

In one embodiment, the camera assembly may include the rear camera. A thickness of the third outer peripheral edge, on the side of the auxiliary bearing plate on which the second lateral surface is positioned, is gradually increased from joints with the first and second outer peripheral edges to a middle part of the respectively. A matched arc-shaped notch may be correspondingly formed in the rear cover. The rear camera may be positioned on the auxiliary bearing plate and correspond to the middle part of the third outer peripheral edge. The rear camera may be exposed from the arc-shaped notch in the second position.

In one embodiment, the mobile phone may further include a flash lamp, the thickness of the third outer peripheral edge, on the side of the auxiliary bearing plate on which the second lateral surface is positioned, is gradually increased from the joints with the first and second outer peripheral edges to a middle part respectively. A matched arc-shaped notch may be correspondingly formed in the rear cover. The flash lamp may be positioned at a position on the auxiliary bearing plate on the side on which the second lateral surface is positioned, and corresponds to a maximum thickness of the third outer peripheral edge. The flash lamp may be exposed from the arc-shaped notch in the second position.

In one embodiment, the camera assembly may include the rear camera. A thickness of the middle part of the third outer peripheral edge, on the side of the auxiliary bearing plate on which the second lateral surface is positioned, is larger than thicknesses of two end parts. The rear camera may be positioned on the auxiliary bearing plate and corresponds to the middle part of the third outer peripheral edge.

In one embodiment, the thickness of the third outer peripheral edge, on the side of the auxiliary bearing plate on which the second lateral surface is positioned, may be gradually decreased from the middle part to the two end parts.

In one embodiment, a matched arc-shaped notch is formed in the rear cover and corresponds to a thickness difference of the third outer peripheral edge on the side of the auxiliary bearing plate on which the second lateral surface is positioned. In the second position, the rear camera may be exposed from the arc-shaped notch.

In one embodiment, the mobile phone may further include a rotating block rotatablely arranged on the auxiliary bearing plate. The camera assembly may be arranged on the rotating block.

In one embodiment, a gap formed when the first side peripheral edge is connected with the first outer peripheral edge may be linear, arc-shaped or broken-line-shaped.

In one embodiment, a gap formed when the second side peripheral edge is connected with the second outer peripheral edge may be linear, arc-shaped or broken-line-shaped.

In one embodiment, the mobile phone may include a motor. A gear may be arranged on an output shaft of the motor, and a rack may be arranged on the auxiliary bearing plate. The rack may cooperate with the gear to allow the auxiliary bearing plate to be switched between the first position and the second position relative to the main bearing plate by the motor.

In one embodiment, the mobile phone may include a motor, a gearbox, a screw rod and a sliding rod. An output shaft of the gearbox may be parallel to a moving direction of the auxiliary bearing plate. The gearbox may include at least two gears which are mutually meshed. The gearbox may be connected between the motor and the screw rod to enable the motor to drive the screw rod into rotation. A helical groove may be formed in the screw rod. The sliding rod may be connected with the auxiliary bearing plate and provided with a snap ring cooperating with the helical groove. The screw rod may be rotated to drive the sliding rod to move, so as to switch the auxiliary bearing plate between the first position and the second position relative to the main bearing plate.

In one embodiment, the snap ring may be rotatablely arranged on the sliding rod.

In one embodiment, the camera assembly may further include a face recognition component.

In one embodiment, the mobile phone may further include an ambient light sensor. A protective cover plate may be arranged on the auxiliary bearing plate. The protective cover plate may be a transparent cover plate and may cover the ambient light sensor and the camera assembly. An edge of the protective cover plate may contact with the first side peripheral edge, the second side peripheral edge and the third side peripheral edge.

In one embodiment, the mobile phone may further include a flash lamp. A protective cover plate may be arranged on the auxiliary bearing plate. The protective cover plate may be a transparent cover plate and may cover the flash lamp and the camera assembly. An edge of the protective cover plate may contact with the first side peripheral edge, the second side peripheral edge and the third side peripheral edge.

In one embodiment, the rear cover may be made of a metal material, a glass material or a ceramic material.

In one embodiment, the display screen may be an Organic Light-Emitting Diode (OLED) display screen or a Liquid Crystal Display (LCD) screen.

In one embodiment, when the second middle frame of the middle frame member is in the first position relative to the first middle frame, a ratio of a display area of the display screen to an area of an outer contour of the middle frame member may be more than or equal to 83%.

Other embodiments of the present disclosure also provide a mobile phone, which include a middle frame, a display screen, a rear cover, a rotating block and a camera assembly.

The middle frame member may have a first lateral surface and a second lateral surface arranged opposite to each other. The middle frame member may include a first middle frame and a second middle frame which are slideably arranged relative to each other. The first middle frame may have a main bearing plate, and the second middle frame may have an auxiliary bearing plate. The auxiliary bearing plate may have a first position and a second position relative to the main bearing plate.

The display screen may be positioned on the side of the main bearing plate on which the first lateral surface is positioned.

The rear cover may be positioned on the side of the main bearing plate on which the second lateral surface is positioned.

The rotating block may be rotatablely arranged on the auxiliary bearing plate. In the first position of the auxiliary bearing plate, the rotating block is not able to rotate relative to the auxiliary bearing plate. In the second position of the auxiliary bearing plate, the rotating block is able to rotate relative to the auxiliary bearing plate.

The camera assembly may be arranged on the rotating block on the auxiliary bearing plate; in the first position of the auxiliary bearing plate, the camera assembly is hidden in the mobile phone, and in the second position, the camera assembly is exposed.

In one embodiment, the mobile phone may further include a motor. A gear may be arranged on an output shaft of the motor. A rack may be arranged on the auxiliary bearing plate. The rack may cooperate with the gear to allow the auxiliary bearing plate to be switched between the first position and the second position relative to the main bearing plate by the motor.

In one embodiment, the mobile phone may further include a motor, a gearbox, a screw rod and a sliding rod. An output shaft of the gearbox may be parallel to a moving direction of the auxiliary bearing plate. The gearbox may include at least two gears which are mutually meshed. The gearbox may be connected between the motor and the screw rod to enable the motor to drive the screw rod into rotation. A helical groove may be formed ill the screw rod. The sliding rod may be connected with the auxiliary bearing plate and provided with a snap ring cooperating with the helical groove. The screw rod may be rotated to drive the sliding rod to move so as to switch the auxiliary bearing plate between the first position and the second position relative to the main bearing plate.

Figure 2:
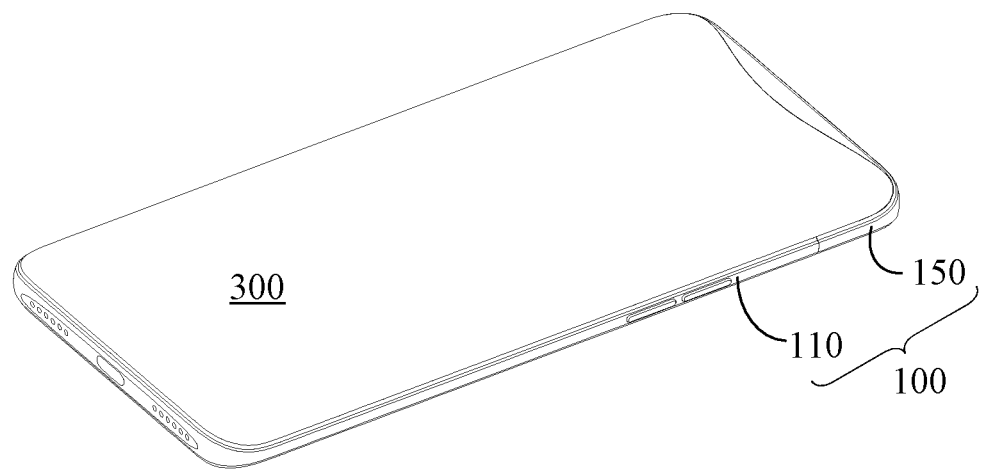
FIG. 2 illustrates a perspective view of the mobile terminal illustrated in FIG. 1 from another viewing angle.
Figure 4:
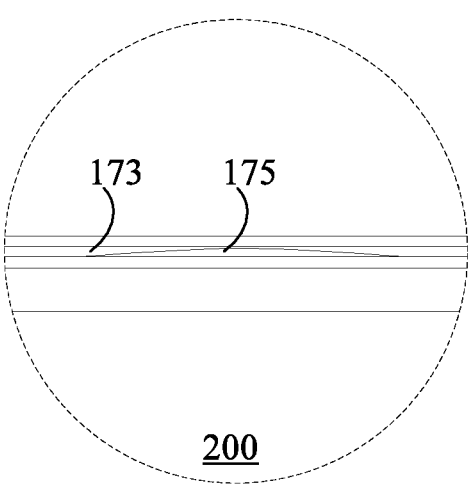
FIG. 4 illustrates an enlarged view of a structure of a part in FIG. 3.
Figure 5:
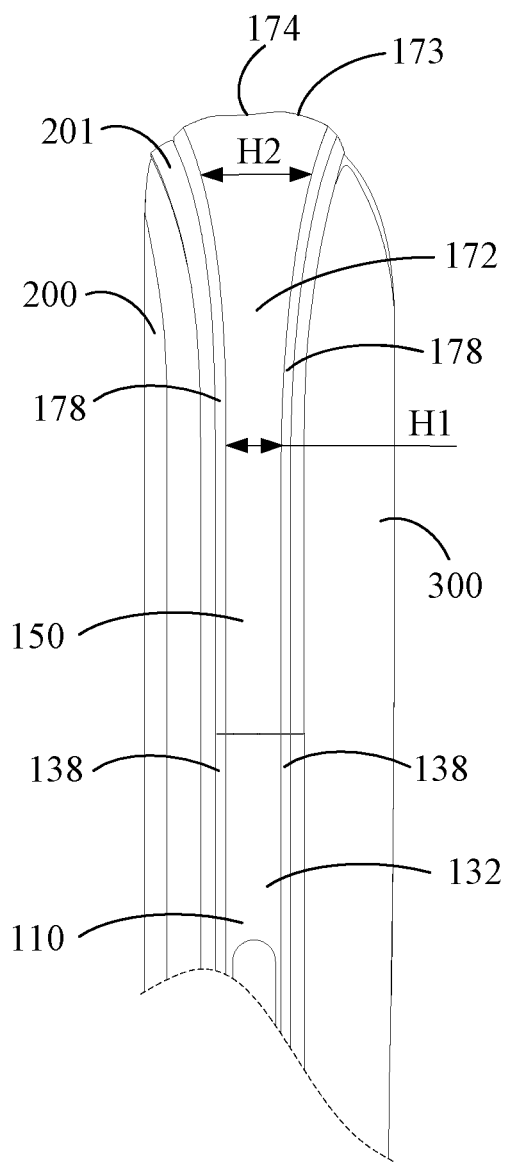
FIG. 5 illustrates an enlarged side view of part of the structure of the mobile terminal illustrated in FIG. 1.
Figure 6:
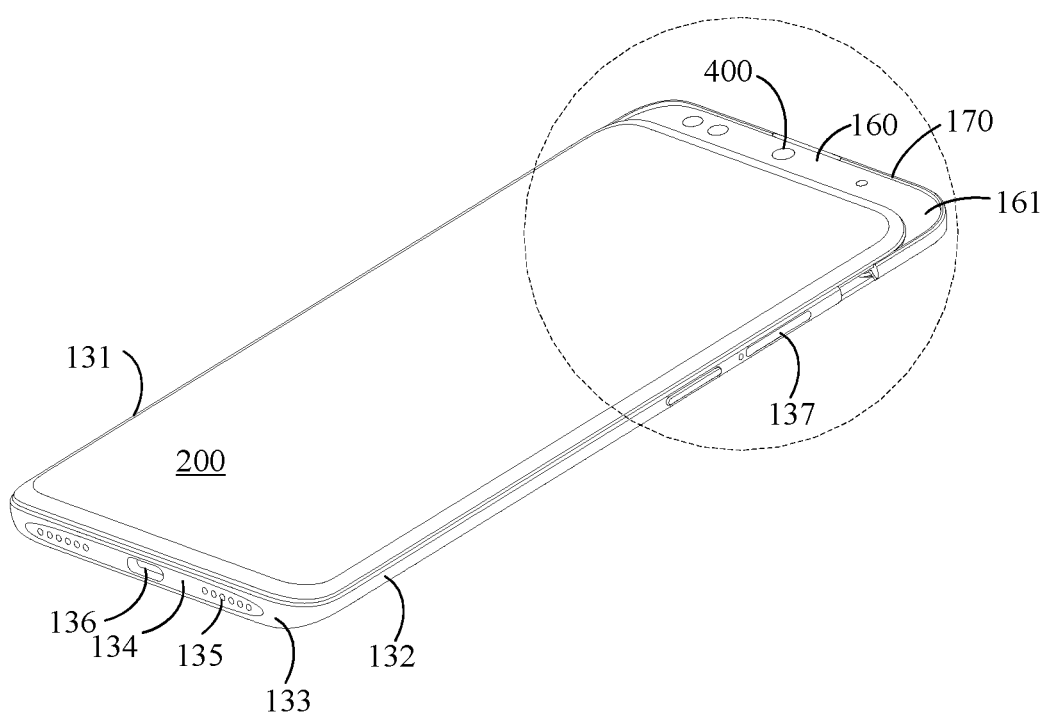
FIG. 6 illustrates a perspective view of a mobile terminal according to an embodiment from a viewing angle, in which a second middle frame in the mobile terminal is in a second position relative to a first middle frame.
Figure 7:
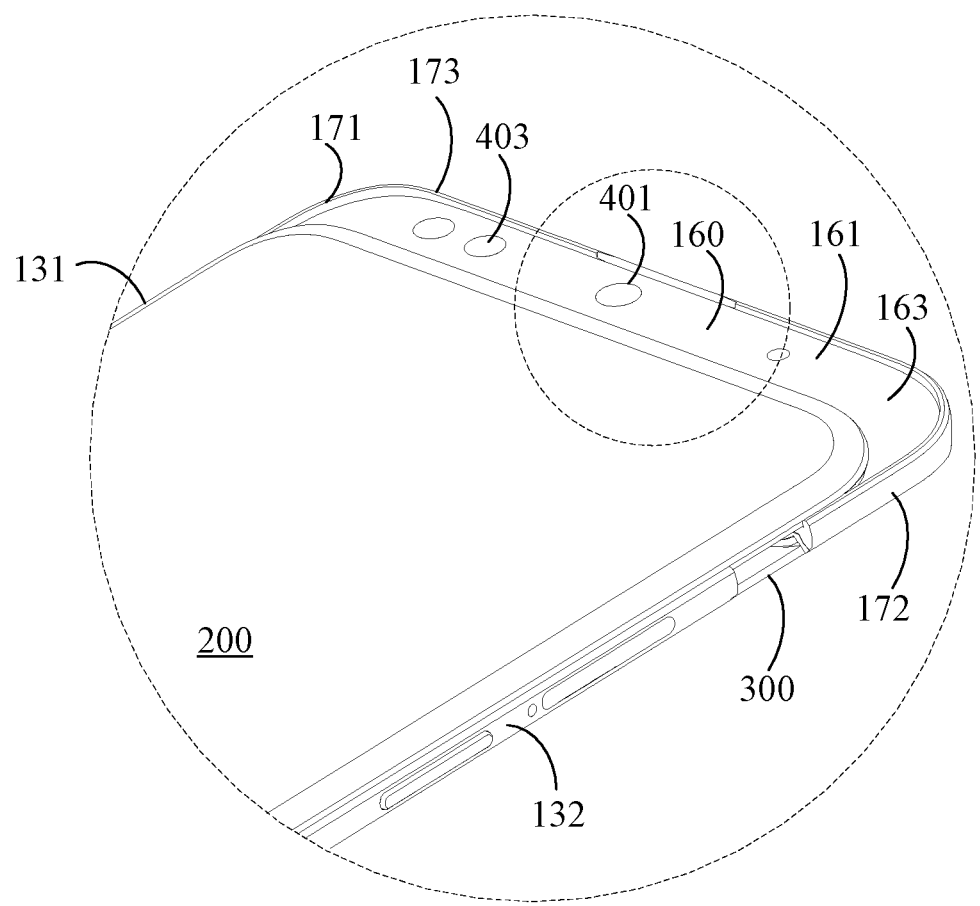
FIG. 7 illustrates an enlarged view of a structure of a part in FIG. 6.

As illustrated in FIG. 1, FIG. 2 and FIG. 6, descriptions will be made to a mobile terminal with a mobile phone as an example in an embodiment. The mobile terminal includes a middle frame member 100, a display screen 200, a rear cover 300 and a camera assembly 400. The middle frame member 100 includes a first middle frame 110 and second middle frame 150 which are slideably arranged relative to each other. The second middle frame 150 has a first position and a second position relative to the first middle frame 110. In FIG. 1-FIG. 5, the second middle frame 150 is in the first position relative to the first middle frame 110. In FIG. 6-FIG. 11, the second middle frame 150 is in the second position relative to the first middle frame 110. The middle frame member 100 is provided with a first lateral surface and second lateral surface which are opposite to each other. The display screen 200 is arranged on the side of the middle frame member 100 on which the first lateral surface is positioned. The rear cover 300 is arranged on the side of the middle frame member 100 on which the second lateral surface is positioned. The camera assembly 400 is arranged on the second middle frame 150 and may move along with the second middle frame 150 relative to the first middle frame 110 to stop in the first position and the second position. As illustrated in FIG. 1 and FIG. 2, when the second middle frame 150 is in the first position, the camera assembly 400 is hidden in the mobile terminal and covered by another component of the mobile terminal and the camera assembly 400 cannot be seen from the outside. As illustrated in FIG. 6 and FIG. 7, when the camera assembly 400 moves to the second position along with the second middle frame 150, the camera assembly 400 may be exposed, the camera assembly 400 may be observed from the outside of the mobile terminal and, in such case, the camera assembly 400 may be used for operations of photographing, making a video call and the like.

The second middle frame 150 may be in the first position relative to the first middle frame 110 when the camera assembly 400 is not required to be used and the second middle frame 150 may be in the second position relative to the first middle frame 110 when the camera assembly 400 is required to be used. By such an arrangement, influence on realization of normal photographing and view finding functions of the camera assembly 400 is avoided, meanwhile, an arrangement space of the display screen 200 is prevented from being occupied and a screen-to-body ratio of the mobile terminal may be increased.

The first middle frame 110 includes a main bearing plate 120 (FIG. 11) and a side peripheral edge 130. In an embodiment, the main bearing plate 120 is substantially a rounded rectangle. The main bearing plate 120 includes a first lateral surface 121, a second lateral surface 122 and four side edges, the first lateral surface 121 and the second lateral surface 122 are arranged opposite to each other. If a plane parallel to an XY plane is defined with a certain point position in a height direction (for example, a Z-axis direction illustrated in FIG. 1) of the mobile terminal, all positions on the first lateral surface 121 may be on one side of the plane and all positions on the second lateral surface 122 may be on the other opposite side of the plane. The display screen 200 is loaded on the side of the main bearing plate 120 on which the first lateral surface 121 is positioned. The rear cover 300 is loaded on the side of the main bearing plate 120 on which the second lateral surface 122 is positioned. The side of the first lateral surface 121 of the main bearing plate 120 may be sunken inwards to form an accommodation cavity, so that the first lateral surface 121 of the main bearing plate 120 is finally presented as not a plane but a combination of multiple stepped surfaces. The display screen 200 is at least partially arranged in the accommodation cavity formed in the main bearing plate 120 in a thickness direction. The accommodation cavity formed in the main bearing plate 120 may also be arranged to place other components of the mobile terminal, for example, a main board, a power supply and a drive component (motor 600 illustrated in FIG. 16). For placing the other components, a structure such as a slotted hole or a structure such as a bump and a plate body may also be formed on the main bearing plate 120. Regardless of a specific structural form on the main bearing plate 120, the side facing the display screen 200 belongs to the first lateral surface 121 of the main bearing plate 120 and the side facing the rear cover 300 belongs to the second lateral surface 122 of the main bearing plate 120. The side of the main bearing plate on which the first lateral surface 121 is positioned may also be called a front side of the main bearing plate 120, and the display screen 200 is arranged on the front side of the main bearing plate 120. The side of the main bearing plate on which the second lateral surface 122 is positioned may also be called a rear side of the main bearing plate 120, and the rear cover 300 is arranged on the rear side of the main bearing plate 120.

The four side edges of the main bearing plate 120 are a left side edge, a right side edge, a bottom side edge and a top side edge respectively. The side peripheral edge 130 is arranged on three side edges, i.e., the left side edge, the right side edge and the bottom side edge respectively, of the main bearing plate 120. The side peripheral edge 130 includes a first side peripheral edge 131, a second side peripheral edge 132 and a third side peripheral edge 133 connected between the first and second side peripheral edges 131 and 132. The first side peripheral edge 131 and the second side peripheral edge 132 are arranged opposite to each other. The first side peripheral edge 131 is arranged on the left side edge of the main bearing plate 120, the second side peripheral edge 132 is arranged on the right side edge of the main bearing plate 120 and the third side peripheral edge 133 is arranged on the bottom side edge of the main bearing plate 120. A height of each side peripheral edge is relatively larger than a height (dimension in the Z-axis direction in FIG. 1) of the main bearing plate 120 and thus each side peripheral edge may form, together with the main bearing plate 120, an accommodation space with a certain depth for placing the display screen 200 and the rear cover 300. The display screen 200 is placed on the side of the main bearing plate 120 on which the first lateral surface 121 is positioned, and meanwhile, the display screen 200 is fixedly connected with the first, second and third side peripheral edges 131, 132 and 133.

As illustrated in FIG. 5, a buffer edge 201 is arranged at an edge of the display screen 200 fixedly connected with the first, second and third side peripheral edges 131, 132 and 133, and hardness of the buffer edge 201 is lower than hardness of a cover plate of the display screen 200. In general, a material for the cover plate of the display screen 200 is glass or hard plastics, so that an internal structure of the display screen 200 may be protected from being impacted and further damaged. The hardness of the buffer edge 201 may be lower than hardness of the glass or hardness of the hard plastics. The buffer edge 201 may be a plastic strip and the buffer edge 201 may be fixed between the side peripheral edge and the display screen 200 by use of glue. With arrangement of the buffer edge 201, a certain plastic deformation space may be reserved for connection between the display screen 200 and the first, second and third side peripheral edges 131, 132 and 133 to prevent influence on stability of connection with the first, second and third side peripheral edges 131, 132 and 133 when the display screen 200 is impacted and avoid physical damages such as cracks caused by impact.

An outer surface of the display screen 200 may be substantially flush with highest positions of the first, second and third side peripheral edges 131, 132 and 133 in the Z-axis direction and thus the outer surface of the display screen 200 may form smooth arc-shaped transitions with edges of the first, second and third side peripheral edges 131, 132 and 133 in the Z-axis direction.

The rear cover 300 is placed on the side of the main bearing plate 120 on which the second lateral surface 122 is positioned, and meanwhile, the rear cover 300 is fixedly connected with the first, second and third side peripheral edges 131, 132 and 133. The rear cover 300 may be connected with the first, second and third side peripheral edges 131, 132 and 133 through the plastic strip and may also be fixedly connected with the first, second and third side peripheral edges 131, 132 and 133 in another manner of glue and the like. An outer surface of the rear cover 300 may be substantially flush with the highest positions of the first, second and third side peripheral edges 131, 132 and 133 in the Z-axis direction and thus the outer surface of the rear cover 300 may form smooth arc-shaped transitions with the edges of the first, second and third side peripheral edges 131, 132 and 133 in the Z-axis direction.

An outer surface of each side peripheral edge 130 may be a plane and may also be an arc-shaped plane. For example, the third side peripheral edge 133 may protrude outwards into an arc in a direction far away from the second middle frame 150. The first side peripheral edge 131 and the second side peripheral edge 132 may also protrude outwards into arcs in directions far away from each other. As illustrated in FIG. 6, a groove 134 is formed in the outer surface of the third side peripheral edge 133. A contour of the groove 134 is substantially oblong. A speaker jack 135 or a connecting port 136 (for example, a port arranged to connecting an external power supply) may be formed in the groove 134. The groove 134 is formed in the outer surface of the side peripheral edge which protrudes outwards, and then the speaker jack 135 and the connecting port 136 are formed in a bottom of the groove 134. Positions of the speaker jack 135 and the connecting port 136 may be sunken into the mobile terminal to prevent a finger of a user from touching sharp points of edges of the speaker jack 135 and the connecting port 136 to avoid the finger of the user being cut and improve a user experience. A button 137 may be arranged on the first side peripheral edge 131 and the button 137 may be arranged to realize functions of volume regulation and the like.

As illustrated in FIG. 5, decorative edges 138 may be arranged on the edge of each side peripheral edge 130. The edge refers to two side edges of the side peripheral edge in the Z-axis direction. More specifically, the side peripheral edge 130 is provided with an outer surface, a first inner surface, a second inner surface, a top surface and a bottom surface. The top surface is connected between the outer surface and the first inner surface. The first inner surface is connected between the first lateral surface 121 of the main bearing plate 120 and the top surface. The bottom surface is connected between the outer surface and the second inner surface. The second inner surface is connected between the second lateral surface 122 of the main bearing plate 120 and the bottom surface. The decorative edges 138 may be positioned on the top surface and bottom surface of the side peripheral edge 130. Material for the decorative edges 138 may be different from the material for the side peripheral edge 130 and has a high-brightness appearance to make the side peripheral edge 130 more attractive and achieve a more attractive appearance effect.

As illustrated in FIG. 6, the height (dimension in the Z-axis direction, i.e., a distance between the top surface and the bottom surface) of the third side peripheral edge 133 is larger than the heights of the first and second side peripheral edges 131 and 132 and the height of the third side peripheral edge 133 at connecting positions with the first and second side peripheral edges 131 and 132 gradually changes to form arc-shaped transitions between the edge of the third side peripheral edge 133 and the edges of the first and second side peripheral edge 131 and 132. The height of the third side peripheral edge 133 is relatively large, so that there is a larger space for arrangement of structures such as the speaker jack 135 and the connecting port 136.

The side edge where a top end of the display screen 200 is positioned extends beyond the first and second side peripheral edges 131 and 132 and the top side edge of the main bearing plate 120. The side edge where a top end of the rear cover 300 is positioned also extends beyond the first and second side peripheral edges 131 and 132 and the top side edge of the main bearing plate 120. A long and narrow passage arranged to clamp the second middle frame 150 is formed between a top side edge of the display screen 200 and a top side edge of the rear cover 300.

The second middle frame 150 includes an auxiliary bearing plate 160 and an outer peripheral edge 170. In an embodiment, a shape of the auxiliary bearing plate 160 is similar to a shape of the main bearing plate 120 but an area of the auxiliary bearing plate 160 is smaller than an area of the main bearing plate 120. The auxiliary bearing plate 160 also includes a first lateral surface 161, a second lateral surface 162 and four side edges, the first lateral surface 161 and the second lateral surface 162 are arranged opposite to each other. An orientation of the first lateral surface 161 of the auxiliary bearing plate 160 is the same as an orientation of the first lateral surface 121 of the main bearing plate 120. An orientation of the second lateral surface 162 of the auxiliary bearing plate 160 is the same as an orientation of the second lateral surface 122 of the main bearing plate 120. The side of the auxiliary bearing plate 160 on which the first lateral surface 161 is positioned is the front side of the mobile terminal. The side of the auxiliary bearing plate 160 on which the second lateral surface 162 is positioned is the rear side of the mobile terminal.

The four side edges of the auxiliary bearing plate 160 are a left side edge, a right side edge, a bottom side edge and a top side edge respectively. The bottom side edge of the auxiliary bearing plate 160 forms a slidable connection with the top side edge of the main bearing plate 120. The outer peripheral edge 170 is arranged on three side edges, i.e., the left side edge, the right side edge and the top side edge respectively, of the auxiliary bearing plate 160. The outer peripheral edge 170 includes a first outer peripheral edge 171, a second outer peripheral edge 172 and a third side peripheral edge 173 connected between the first and second outer peripheral edges 171 and 172. The first outer peripheral edge 171 and the second outer peripheral edge 172 are arranged opposite to each other. The first outer peripheral edge 171 is arranged on the left side edge of the auxiliary bearing plate 160, the second outer peripheral edge 172 is arranged on the right side edge of the auxiliary bearing plate 160 and the third outer peripheral edge 173 is arranged on the top side edge of the auxiliary bearing plate 160.

Decorative edges 178 may be arranged on an edge of the outer peripheral edge 170. The edge refers to two side edges of the outer peripheral edge 170 in the Z-axis direction. More specifically, the outer peripheral edge 170 is provided with an outer surface, a first inner surface, a second inner surface, a top surface and a bottom surface. The top surface is connected between the outer surface and the first inner surface. The first inner surface is connected between the first lateral surface 161 of the auxiliary bearing plate 160 and the top surface. The bottom surface is connected between the outer surface and the second inner surface. The second inner surface is connected between the second lateral surface 162 of the auxiliary bearing plate 160 and the bottom surface. The decorative edges 178 may be positioned on the top surface and bottom surface of the outer peripheral edge 170. Material for the decorative edges 178 may be different from a material for the outer peripheral edge 170 and has a high-brightness appearance to make the outer peripheral edge 170 more attractive and achieve a more attractive appearance effect. As illustrated in FIG. 5, when the second middle frame 150 is in the first position, the first side peripheral edge 131 is connected with the first outer peripheral edge 171, the second side peripheral edge 132 is connected with the second outer peripheral edge 172 and the decorative edges 138 on the side peripheral edge 130 are butted with the decorative edges 178 on the outer peripheral edge 170. In addition, a part of the display screen 200 extending beyond the first middle frame 110 closely fits with the first, second and third outer peripheral edges 171, 172 and 173 of the second middle frame 150, it is apparent that the display screen 200 is also connected with the first, second and third outer peripheral edges 171, 172 and 173 and, under the condition of high machining accuracy, fit clearances between the display screen 200 and the first, second and third outer peripheral edges 171, 172 and 173 may be indistinguishable for eyes. In the first position, it may be considered that the first middle frame 110 and the second middle frame 150 bear the display screen 200 together. Similarly, a part of the rear cover 300 extending beyond the first middle frame 110 also closely fits with the first, second and third outer peripheral edges 171, 172 and 173 of the second middle frame 150, it is apparent that the rear cover 300 is also connected with the first, second and third outer peripheral edges 171, 172 and 173 and, under the condition of high machining accuracy, fit clearances between the rear cover 300 and the first, second and third outer peripheral edges 171, 172 and 173 may be indistinguishable for eyes.

A height (extending dimension in the Z-axis direction, i.e., a distance between the top surface and the bottom surface) of each outer peripheral edge 170 is larger than a height of the auxiliary bearing plate 160. The outer surface of each outer peripheral edge 170 may be a plane and may also be an arc-shaped plane. For example, the first outer peripheral edge 171 and the second outer peripheral edge 172 may protrude outwards into arcs in directions far away from each other. The third outer peripheral edge 173 protrudes outwards in a direction far away from the first middle frame 110 and is arc-shaped. As illustrated in FIG. 5, a groove 174 may also be formed in the outer surface of the third outer peripheral edge 173. A structure of the groove 174 may be the same as the structure of the groove 134 in the third side peripheral edge 133. Moreover, the two grooves 174 and 134 are symmetrically formed in a length direction of the mobile terminal. A microphone jack, a connecting port and the like may be formed in the groove 174.

As illustrated in FIG. 5, the height H2 (dimension in the Z-axis direction, i.e., the distance between the top surface and the bottom surface) of the third outer peripheral edge 173 is larger than the heights H1 of the first and second outer peripheral edges 171 and 172, and the height of the third outer peripheral edge 173 at connecting positions with the first and second outer peripheral edges 171 and 172 gradually changes to form arc-shaped transitions between the edge of the third outer peripheral edge 173 and the edges of the first and second outer peripheral edge 171 and 172. The height of the third outer peripheral edge 173 is relatively large, so that there is a larger space for arrangement of structures such as the microphone jack and connecting port formed in the third outer peripheral edge 173. In addition, the third outer peripheral edge 173 form the arc-shaped transitions with the first and second outer peripheral edges 171 and 172, so that impurities such as dust may be prevented from entering the auxiliary bearing plate 160 from a gap between the third outer peripheral edge 173 and the display screen 200.

Figure 10:
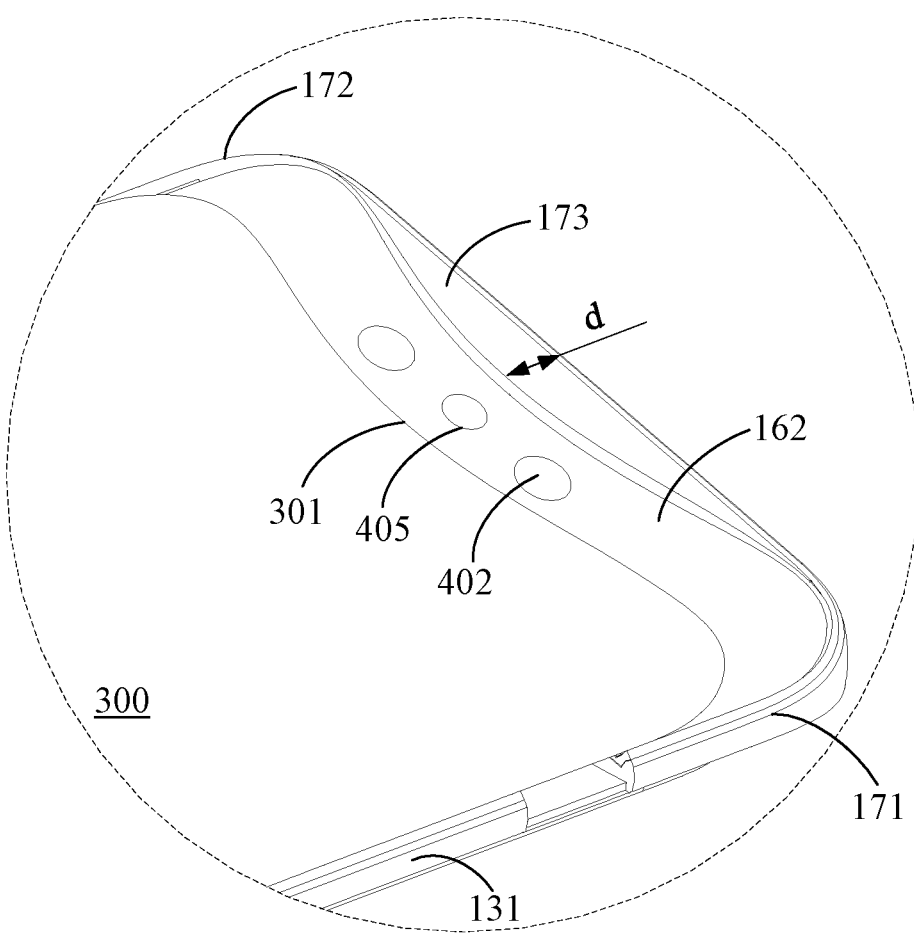
FIG. 10 illustrates an enlarged view of a structure of a part in FIG. 9.

When the camera assembly 400 is required to be used, the second middle frame 150 slides relative to the first middle frame 110, as illustrated in FIG. 7 and FIG. 10. In the second position, the first side peripheral edge 131 is spaced from the first outer peripheral edge 171 and the second side peripheral edge 132 is spaced from the second outer peripheral edge 172.

As illustrated in FIG. 6 and FIG. 7, the camera assembly 400 includes a front camera 401 and an orientation of a light entering surface of the front camera 401 is the same as an orientation of the display screen 200. The front camera 401 may be exposed from the side of the auxiliary bearing plate 160 on which the first lateral surface 161 is positioned. When the auxiliary bearing plate 160 is in the second position relative to the main bearing plate 120, the auxiliary bearing plate 160 may drive the front camera 401 to be exposed from the edge on which the top end of the display screen 200 is positioned. When the auxiliary bearing plate 160 is in the first position relative to the main bearing plate 120, the auxiliary bearing plate 160 drives the front camera 401 to be hidden between the top end of the display screen 200 and the top end of the rear cover 300.

As illustrated in FIG. 6 and FIG. 7, the camera assembly 400 further includes a face recognition component 403. The face recognition component 403 includes components, such as an infrared lens, a floodlight sensing element, a distance sensor and a dot matrix projector, arranged on the auxiliary bearing plate 160 and these components may cooperate for face recognition. The camera assembly 400 may further include an ambient light sensor. The ambient light sensor may also be arranged on the side of the auxiliary bearing plate 160 on which the first lateral surface 161 is positioned, and is integrated with the face recognition component 403 and the front camera 401.

A protective cover plate 163 is arranged on the side of the auxiliary bearing plate 160 on which the first lateral surface 161 is positioned, and a light permeable region corresponding to the front camera 401 is arranged on the protective cover plate 163. In the embodiment where the face recognition component 403 is provided, the light permeable region matched with the components, such as the infrared lens, the floodlight sensing element, the distance sensor and the dot matrix project, is also formed on the protective cover plate 163. In some embodiments, the protective cover plate 163 may be monolithic transparent glass and may also be glass with a transparent region arranged at a position corresponding to a component such as the front camera 401. An edge of the protective cover plate 163 contacts with the first outer peripheral edge 171, the second outer peripheral edge 172 and the third outer peripheral edge 173. The protective cover plate 163 may be arranged to protect the front camera 401 and the face recognition component 403. In addition, when the auxiliary bearing plate 160 is observed from the first lateral surface 161, structural integrity thereof is higher.

Figure 9:
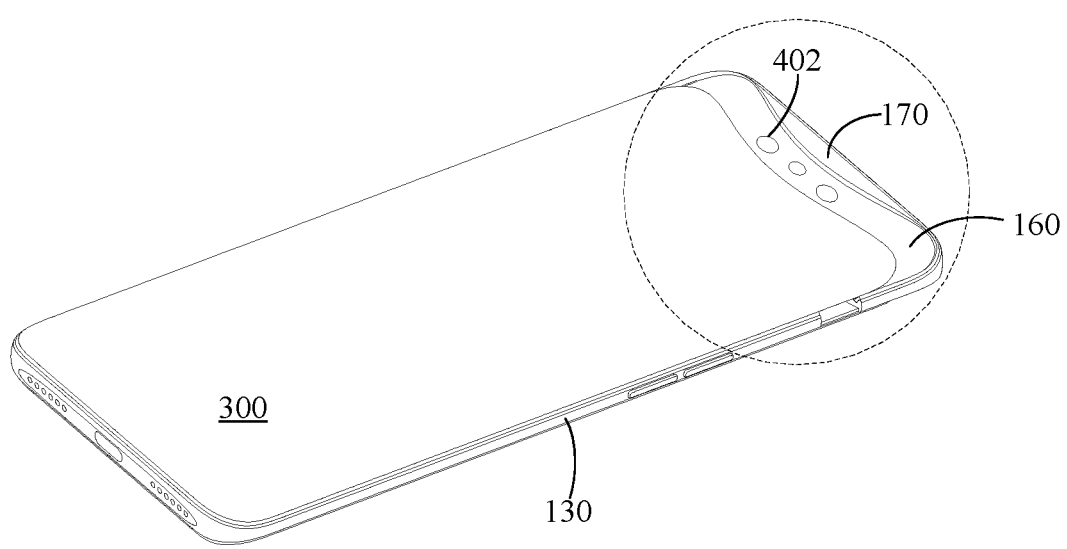
FIG. 9 illustrates a perspective view of the mobile terminal in FIG. 6 from another viewing angle.

As illustrated in FIG. 9 and FIG. 10, the camera assembly 400 further includes a rear camera 402. An orientation of a light entering surface of the rear camera 402 is opposite to the orientation of the display screen 200. The rear camera 402 may be exposed from the side where the second lateral surface 162 is positioned, of the auxiliary bearing plate 160. When the auxiliary bearing plate 160 is in the second position relative to the main bearing plate 120, the auxiliary bearing plate 160 may drive the rear camera 402 to be exposed from the edge where the top end of the rear cover 300 is positioned. When the auxiliary bearing plate 160 is in the first position relative to the main bearing plate 120, the auxiliary bearing plate 160 drives the rear camera 402 to be hidden between the top end of the rear cover 300 and the top end of the display screen 200.

In an embodiment, the mobile phone may further include a flash lamp 405. The flash lamp 405 and the rear camera 402 are integrated on the auxiliary bearing plate 160.

Another protective cover plate 164 is arranged on the side of the auxiliary bearing plate 160 on which the second lateral surface 162 is positioned, and a light permeable region corresponding to the rear camera 402 is arranged on the protective cover plate 164. In some embodiments, the protective cover plate 164 may be monolithic transparent glass and may also be glass with a transparent region arranged at a position corresponding to a component such as the rear camera 402. An edge of the protective cover plate 164 contacts with the first side peripheral edge 131, the second side peripheral edge 132 and the third side peripheral edge 133. The protective cover plate 164 may be arranged to protect components such as the rear camera 402 and the flash lamp 405. In addition, when the auxiliary bearing plate 160 is observed from the second lateral surface 162, the structural integrity thereof is higher.

Positions of the rear camera 402 and the front camera 401 on the auxiliary bearing plate 160 are mutually staggered. Since the cameras have certain heights, arranging the rear camera 402 and the front camera 401 in a staggered manner may avoid superposition on height of the rear camera 402 and the front camera 401 on height, prevent an excessively dimension of the auxiliary bearing plate 160 in the Z-axis direction and reduce an overall height of the mobile terminal.

Figure 11:
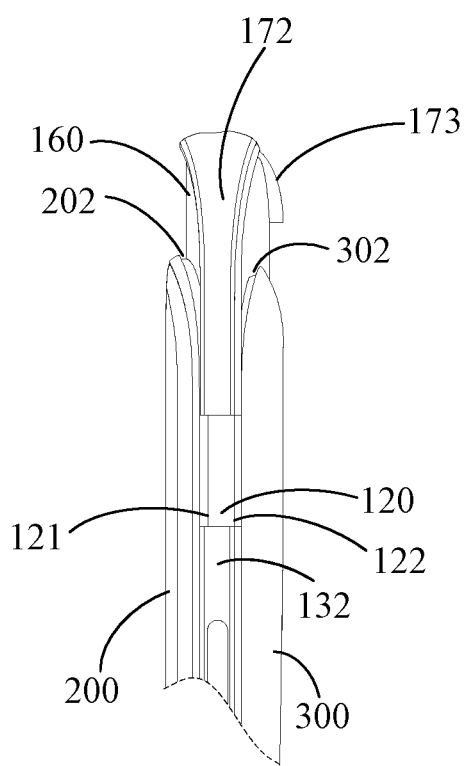
FIG. 11 illustrates an enlarged structural side view of the mobile terminal in FIG. 6.

As illustrated in FIG. 9, FIG. 10 and FIG. 11, a thickness d (extending dimension of the third outer peripheral edge 173 in the length direction of the mobile terminal, i.e., the Z-axis direction) of the third outer peripheral edge 173, on the side of the auxiliary bearing plate 160 on which the second lateral surface 162 is positioned, is gradually increased from joints with the first and second outer peripheral edges 171 and 172 to a middle part respectively, and a matched arc-shaped notch 301 is correspondingly formed in the rear cover 300. The rear camera 402 is positioned on the auxiliary bearing plate 160 and corresponds to the middle part of the third outer peripheral edge 173, and is exposed from the arc-shaped notch 301 in the second position. The arc-shaped notch 301 is provided and the rear camera 402 is exposed from the arc-shaped notch 301, so that a moving distance of the rear camera. 402, and thus a moving distance of the auxiliary bearing plate 160, during switching from the first position to the second position may be shortened.

In some other embodiments, the flash lamp 405 is arranged a on the side of the auxiliary bearing plate 160 on which the second lateral surface 162 is positioned, and corresponds to a maximum thickness of the third outer peripheral edge 173.

It can be understood that, in some other embodiments, a thickness d of the middle part of the third outer peripheral edge 173, on the side of the auxiliary bearing plate 160 on which the second lateral surface 162 is positioned, is larger than thicknesses d of two end parts. The thickness of the third outer peripheral edge 173, on the side of the auxiliary bearing plate 160 on which the second lateral surface 162 is positioned, may be gradually decreased from the middle part to the two end parts and may also change suddenly.

As illustrated in FIG. 11, the edge of the display screen 200 is provided with a stepped slot 202. In the embodiment where the buffer edge 201 is provided, the stepped slot 202 may be formed in the buffer edge 201. As illustrated in FIG. 5, when the auxiliary bearing plate 160 is in the first position, part of a structure of the outer peripheral edge 170 is accommodated in the stepped slot 202. Specifically, the top surface of the outer peripheral edge 170 is partially covered by the edge of the display screen 200, the top surface of the third outer peripheral edge 170 is partially exposed in an X-axis direction and, correspondingly, the top surfaces of the first and second outer peripheral edges 171 and 172 are partially exposed in a Y-axis direction.

An edge of the rear cover 300 is provided with a stepped slot 302 and, when the auxiliary bearing plate 160 is in the first position, part of the structure of the outer peripheral edge 170 is accommodated in the stepped slot 302.

Figure 3:
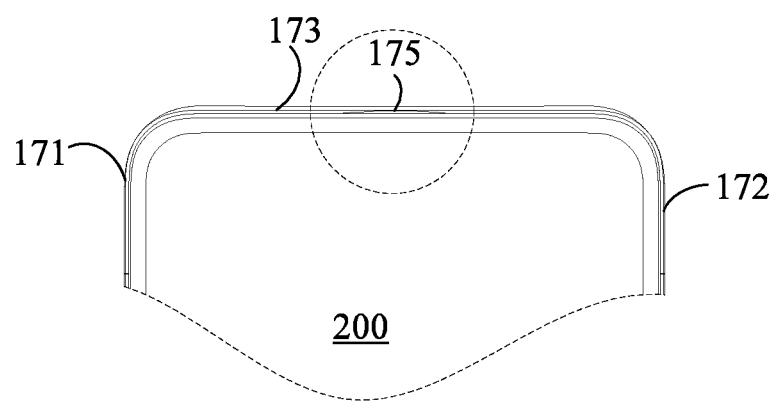
FIG. 3 illustrates a front view of part of a structure of the mobile terminal in FIG. 1.
Figure 8:
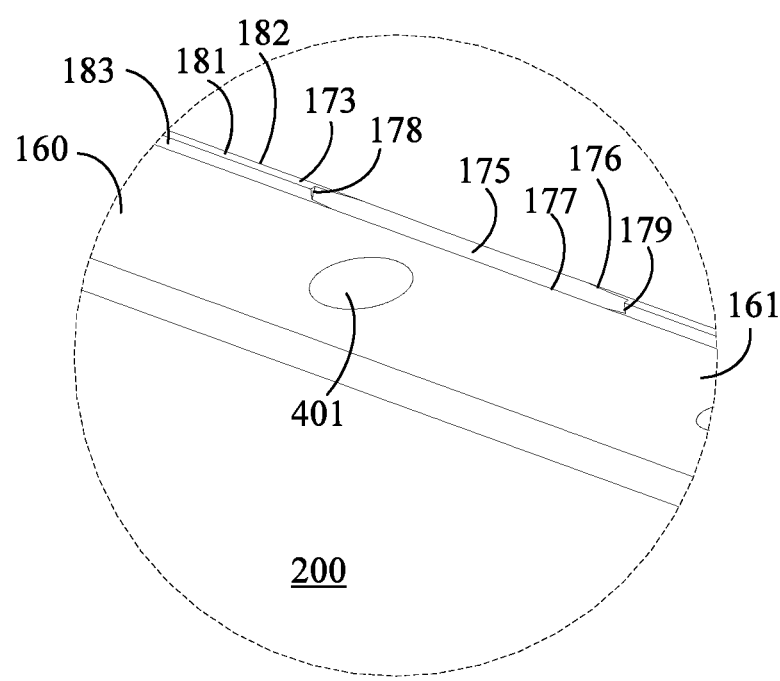
FIG. 8 illustrates an enlarged view of a structure of a part in FIG. 7.

In some embodiments, other functional elements such as a telephone receiver are also integrated on the auxiliary bearing plate 160. When the auxiliary bearing plate 160 is in the first position and if the fit clearance between the edge of the display screen 200 and the outer peripheral edge 170 is too small, a receiving effect of the telephone receiver may be influenced. For solving the problem, in an embodiment, as illustrated in FIG. 3, FIG. 3, FIG. 7 and FIG. 8, a telephone receiver slot 175 is formed in the third outer peripheral edge 173. The third outer peripheral edge 173 includes a top surface 181, an outer surface 182 and an inner surface 183. The inner surface 183 is connected between the top surface 181 and the first lateral surface 161 of the auxiliary bearing plate 160.

A bottom of the telephone receiver slot 175 is provided with two boundaries in the Z-axis direction, i.e., a first boundary 176 and a second boundary 177, and two boundaries in the Y-axis direction, i.e., a third boundary 178 and a fourth boundary 179. The first boundary 176 is arc-shaped, a middle part of the first boundary 176 is flush with an intersection line of the top surface 181 and the outer surface 182 and two end parts of the first boundary 176 are positioned on the top surface 181. The second boundary 177 is flush with the first lateral surface 161 of the auxiliary bearing plate 160. Both of the third boundary 178 and the fourth boundary 179 are intersected with the inner surface 183 and the top surface 181 to endow the telephone receiver slot 175 with a certain depth (substantially an extending distance in the Z-axis direction) and length (an extending direction in the Y-axis direction) and, meanwhile, a thickness (extending dimension in the X-axis direction) of the part on the third outer peripheral edge 173, where the telephone receiver slot 175 is formed, is smaller than a thickness of the other part. As illustrated in FIG. 4, when the auxiliary bearing plate 160 is in the first position, the top surface 181 of the third outer peripheral edge 173 is partially covered by the edge of the display screen 200 and the middle part of the first boundary 176 of the telephone receiver slot 175 is exposed. A passage may be formed between the exposed part of the telephone receiver slot 175 and the telephone receiver on the first lateral surface 161 of the auxiliary bearing plate 160, so that the telephone receiver may transmit sounds to the outside through the telephone receiver slot 175 and a receiving effect of the telephone receiver is improved. Therefore, even if the auxiliary bearing plate 160 is in the first position, influence on use of the telephone receiver may also be avoided.

As illustrated in FIG. 5 and FIG. 11, the butted edges of the first side peripheral edge 131 and the first outer peripheral edge 171 may be linear and thus a gap formed when the first side peripheral edge 131 is connected with the first outer peripheral edge 171 may be linear. Similarly, the butted edges of the second side peripheral edge 132 and the second outer peripheral edge 172 may be linear and thus a gap formed when the second side peripheral edge 132 is connected with the second outer peripheral edge 172 may be linear.

Figure 12:
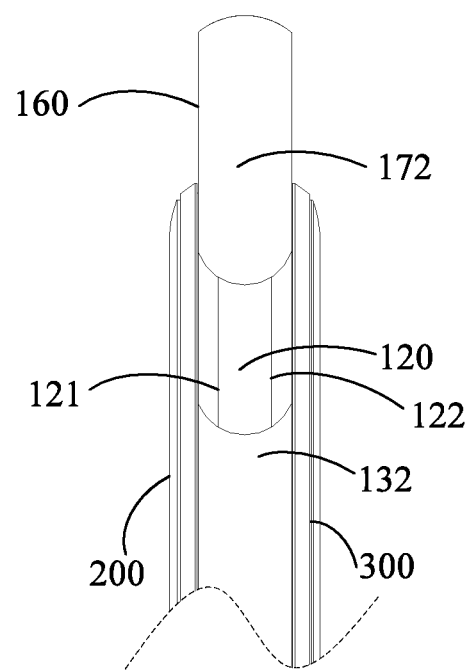
FIG. 12 and FIG. 13 illustrate enlarged structural side views of mobile terminals according to different embodiments.

In some other embodiments, as illustrated in FIG. 12, the gap formed when the first side peripheral edge 131 is connected with the first outer peripheral edge 171 may be arc-shaped. Similarly, the gap formed when the second side peripheral edge 132 is connected with the second outer peripheral edge 172 may be arc-shaped.

Figure 13:
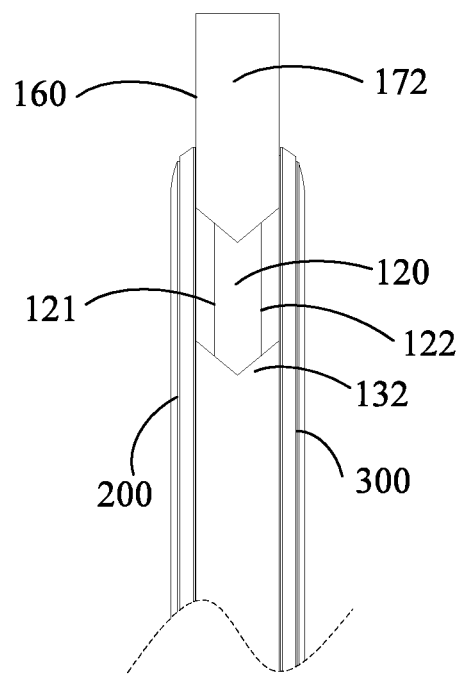

As illustrated in FIG. 13, the gap formed when the first side peripheral edge 131 is connected with the first outer peripheral edge 171 may be broken-line-shaped. Similarly, the gap formed when the second side peripheral edge 132 is connected with the second outer peripheral edge 172 may be broken-line-shaped.

Figure 14:
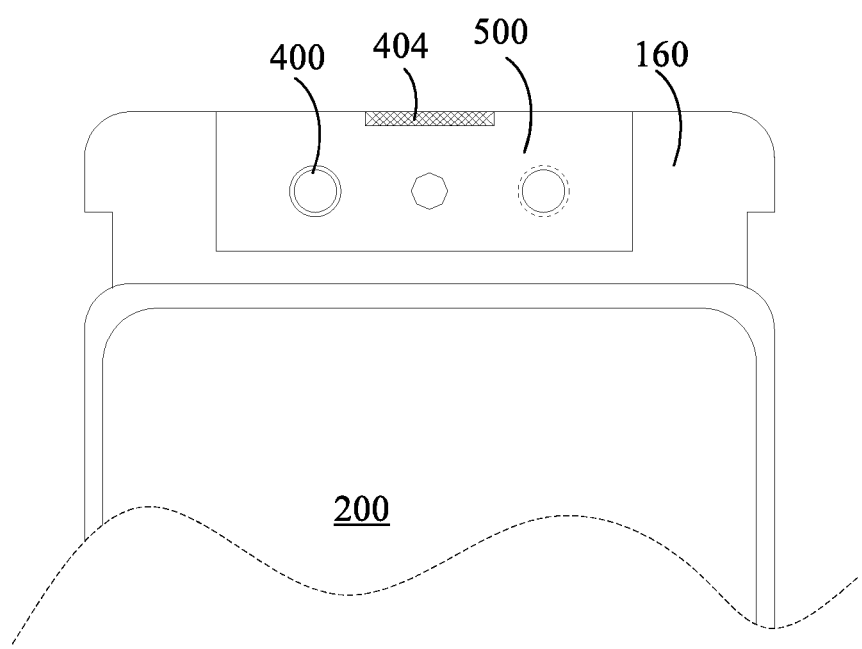
FIG. 14 illustrates a front view of part of a structure of a mobile terminal according to another embodiment.
Figure 15:
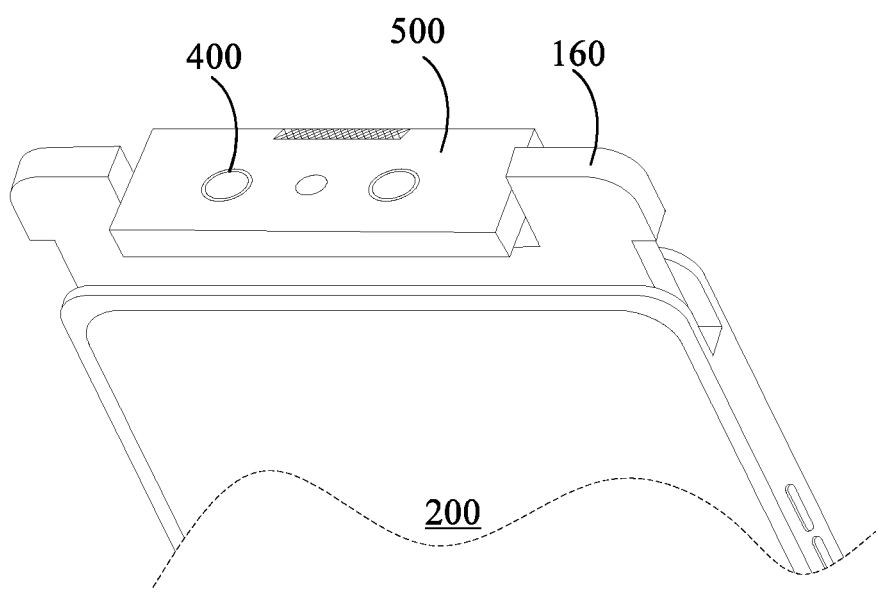
FIG. 15 illustrates a perspective view of part of a structure of the mobile terminal in FIG. 14.

As illustrated in FIG. 14 and FIG. 15, in an embodiment, the mobile phone further includes a rotating block 500 rotatablely arranged on the auxiliary bearing plate 160. A rotating shaft of the rotating block 500 is parallel to a width direction (Y-axis extending direction) of the mobile terminal. When the auxiliary bearing plate 160 is in the second position relative to the main bearing plate 120, the rotating block 500 may rotate relative to the auxiliary bearing plate 160. When the auxiliary bearing plate 160 is in the first position relative to the main bearing plate 120, a rotating space of the rotating block 500 is limited and it may not rotate relative to the auxiliary bearing plate 160.

The camera assembly 400 is arranged on the rotating block 500. The camera assembly 400 is arranged on the rotating block 500. When necessary, the camera assembly 400 may be used as the front camera or the rear camera by changing a position of the rotating block 500 relative to the auxiliary bearing plate 160, and arrangement of cameras in two orientations is avoided. Other components such as the telephone receiver 404 may also be arranged on the rotating block 500.

A corresponding transmission mechanism may also be arranged for the slidable connection between the auxiliary bearing plate 160 and the main bearing plate 120. By use of the transmission mechanism, the auxiliary bearing plate 160 and the main bearing plate 120 may be switched to and fro more automatically between the first position and the second position.

Figure 16:
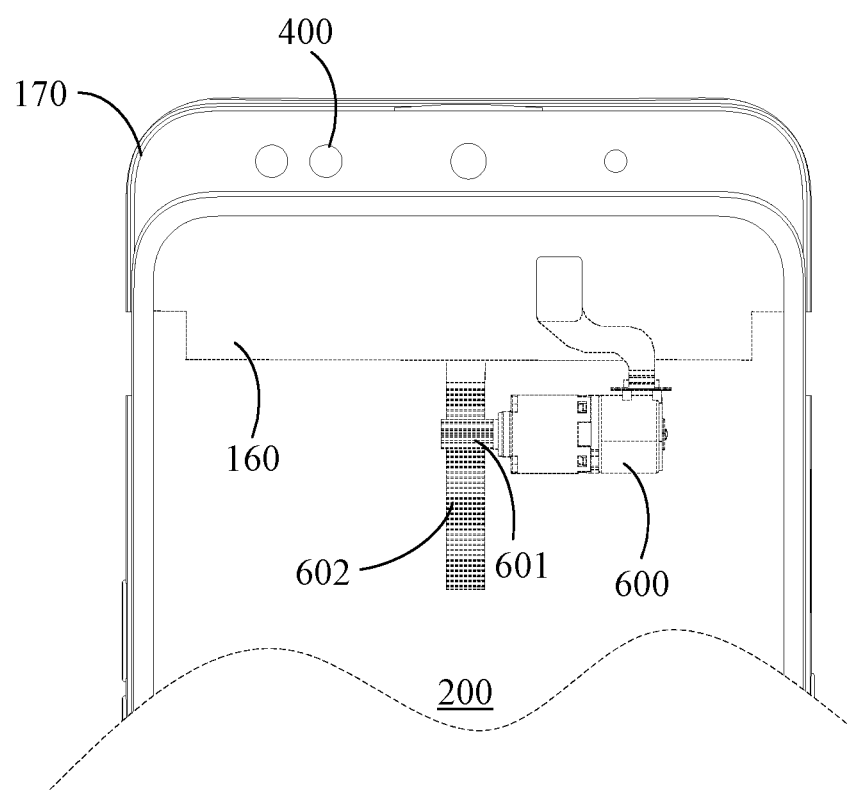
FIG. 16 illustrates a transmission mechanism of a mobile terminal according to an embodiment.
Figure 17:
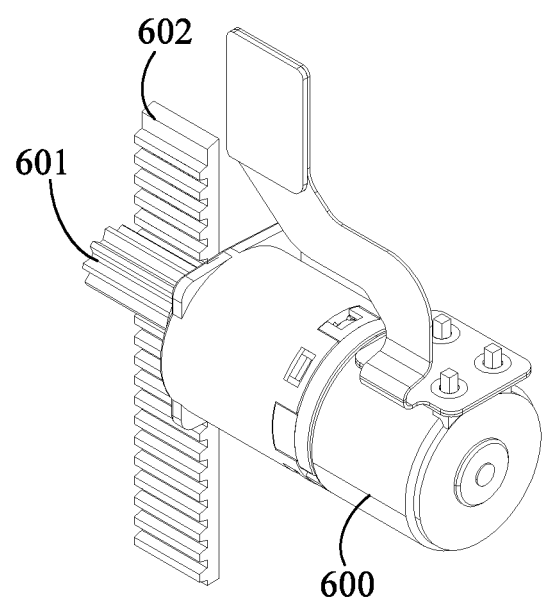
FIG. 17 illustrates an enlarged view of the transmission mechanism of the mobile terminal in FIG. 16.

As illustrated in FIG. 16 and FIG. 17, in an embodiment, the mobile terminal includes a motor 600. A gear 601 is arranged on an output shaft of the motor 600, a rack 602 is arranged on the auxiliary bearing plate 160, and the rack 602 cooperates with the gear 601 to allow the auxiliary bearing plate 160 to be switched between the first position and the second position relative to the main bearing plate 120 by the motor 600. The motor 600 may form a communication connection with the main board of the mobile terminal and receive a control signal sent by the main board to rotate in different directions, thereby driving the auxiliary bearing plate 160 to be switched between the first position and the second position. The motor 600 may be fixed on the main bearing plate 120. A sliding rail and sliding chute which cooperate with each other may also be arranged between the main bearing plate 120 and the auxiliary bearing plate 160 to ensure more smooth movement of the auxiliary bearing plate 160 relative to the main bearing plate 120.

Figure 18:
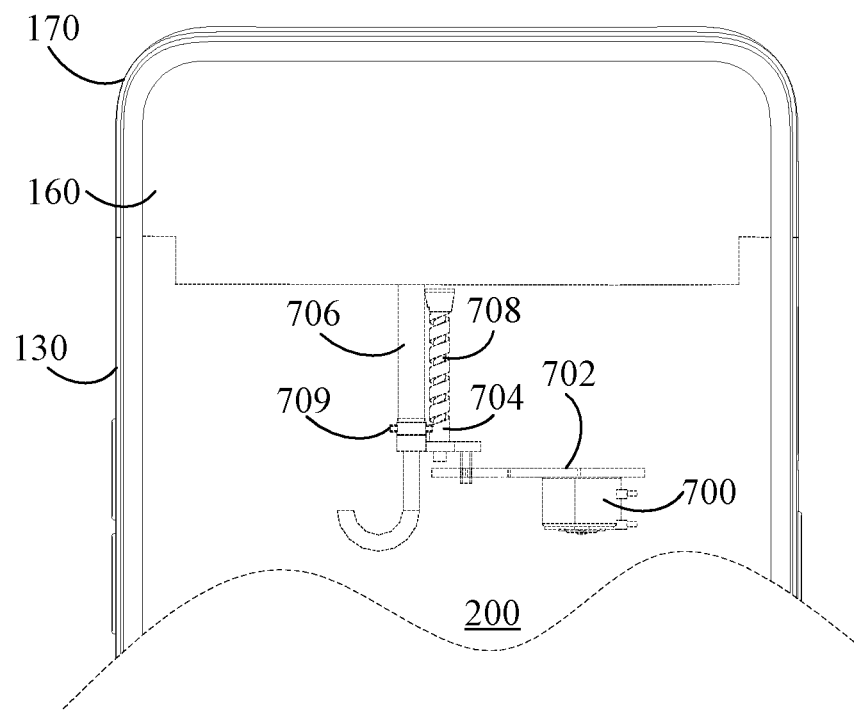
FIG. 18 illustrates a transmission mechanism of a mobile terminal according to another embodiment, in which a second middle frame is in a second position relative to a first middle frame.
Figure 19:
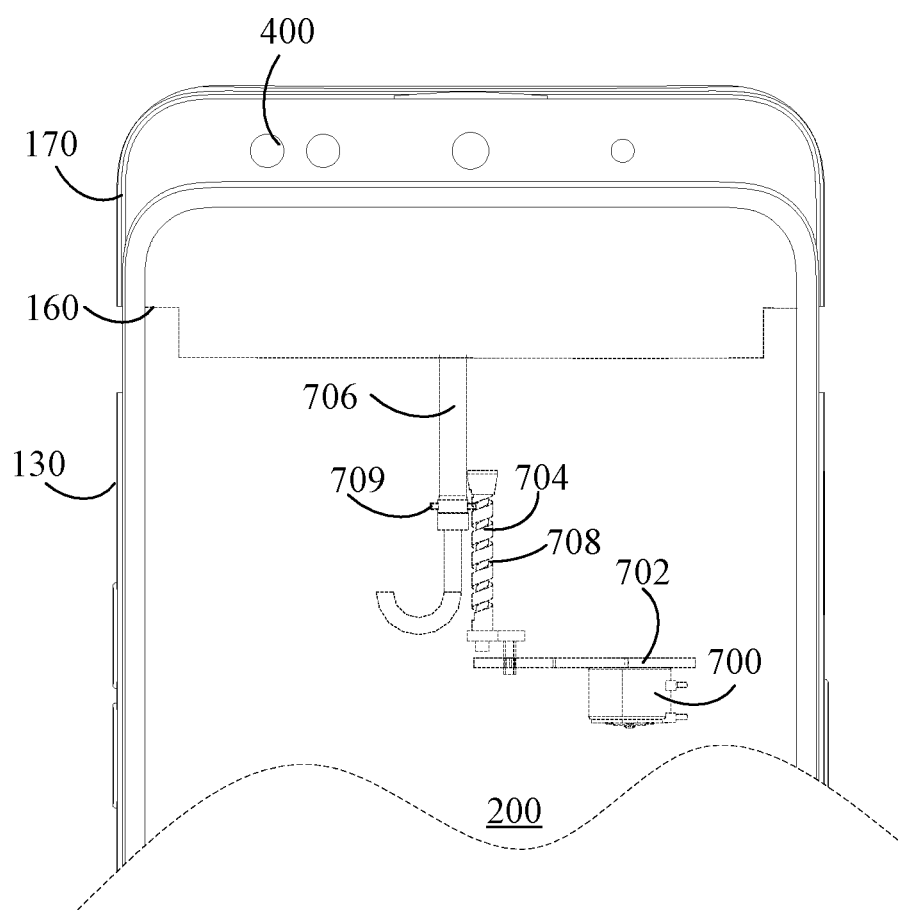
FIG. 19 illustrates a transmission mechanism of a mobile terminal according to another embodiment, in which a second middle frame is in a first position relative to a first middle frame.
Figure 20:
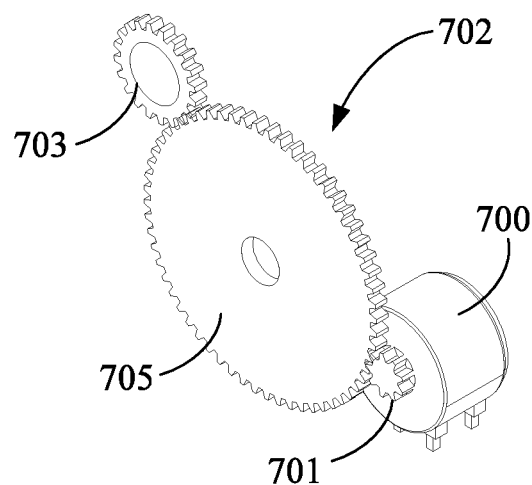
FIG. 20 illustrates an enlarged view of part of the transmission mechanisms of the mobile terminals in FIG. 18 and FIG. 19.

As illustrated in FIG. 18, FIG. 19 and FIG. 20, in another embodiment, the mobile terminal includes a motor 700, a gearbox 702, a screw rod 704 and a sliding rod 706. An output shaft of the gearbox 702 is parallel to the moving direction of the auxiliary bearing plate 160. The gearbox 702 is connected between the motor 700 and the screw rod 704 to enable the motor 700 to drive the screw rod 704 into rotation. A helical groove 708 is formed in the screw rod 704. The sliding rod 706 is connected with the auxiliary bearing plate 160. The sliding rod 706 is provided with a snap ring 709 cooperating with the helical groove 708. The screw rod 704 rotates to drive the snap ring 709 on the sliding rod 706 to move in the helical groove 708 to further switch the auxiliary bearing plate 160 between the first position and the second position relative to the main bearing plate 120. The snap ring 709 may be rotatablely arranged on the sliding rod 706, so that a frictional force generated in a relative movement process of the sliding rod 706 and the screw rod 704 may be reduced, the sliding rod may move relative to the screw rod 704 in a more labor-saving manner, and more energy is saved. The motor 700 may form a communication connection with the main board of the mobile terminal and receive the control signal sent by the main board to rotate in different directions, thereby driving the auxiliary bearing plate 160 to be switched between the first position and the second position. The sliding rod 706 may be arranged to be hollow and an internal space may be used as a wiring passage to form a communication connection between the camera assembly 400 on the auxiliary bearing plate 160 and the main hoard of the mobile terminal. The gearbox 702 includes a first gear 703 and second gear 705 which are mutually meshed. The first gear 703 may cooperate with the screw rod 704. For example, a corresponding matched gear is arranged at an end part of the screw rod 704 to drive the screw rod 704 into rotation. The second gear 705 may be meshed with an output gear 701 on the output shaft of the motor 700. The gear number of the gearbox 702 and a dimension proportion of each gear may be reasonably set according to the dimension of the mobile terminal and a space configuration of the other components.

The display screen 200 may be an OLED display screen or an LCD screen. The display screen 200 may carry a touch assembly to endow the display screen 200 with a touch operation function.

The rear cover 300 may be made of a metal material, a glass material or a ceramic material.

When the second middle frame 150 of the middle frame member 100 is in the first position relative to the first middle frame 110, a ratio of a display area of the display screen 200 to an area of an outer contour of the middle frame member 100 is more than or equal to 83%.

Each technical feature of the above embodiments may be freely combined. For brief description, not all possible combinations of each technical feature in the abovementioned embodiments are described, but all the combinations of these technical features shall fall within the scope recorded in the description without conflicts.

The abovementioned embodiments only express some implementation modes of the disclosure and are specifically described in detail and not thus understood as limits to the patent scope of the disclosure. It is to be pointed out that those of ordinary skill in the art may further make a plurality of transformations and improvements without departing from the concept of the disclosure and all of these falls within the scope of protection of the disclosure. Therefore, the scope of patent protection of the disclosure should be subject to the appended claims.

The invention claimed is:

1. A mobile phone, comprising:
   a middle frame member comprising a first middle frame and a second middle frame; the first middle frame comprises a main bearing plate and a side peripheral edge, the main bearing plate comprising a first lateral surface, a second lateral surface, a first side edge, a second side edge, a third side edge and a fourth side edge, the first lateral surface and the second lateral surface being arranged opposite to each other, the side peripheral edge being arranged on the first side edge, the second side edge and the third side edge of the main bearing plate and comprising a first side peripheral edge, a second side peripheral edge and a third side peripheral edge connected between the first and second side peripheral edges, the first side peripheral edge and the second side peripheral edge being arranged opposite to each other; the second middle frame comprises an auxiliary bearing plate and an outer peripheral edge, the auxiliary bearing plate comprising a first lateral surface, a second lateral surface, a fifth side edge, a sixth side edge, a seventh side edge and a eighth side edge, the first lateral surface and the second lateral surface being arranged opposite to each other, the outer peripheral edge being arranged on the fifth side edge, the sixth side edge and the seventh side edge of the auxiliary bearing plate and comprising a first outer peripheral edge, second outer peripheral edge and a third outer peripheral edge connected between the first and second outer peripheral edges, the first outer peripheral edge and the second outer peripheral edge being arranged opposite to each other, a side of the auxiliary bearing plate where the eighth side edge is located is slidably connected with a side of the main bearing plate where the fourth side edge is located, the auxiliary bearing plate having a first position and a second position relative to the main bearing plate; in the first position, the first side peripheral edge is in contact with the first outer peripheral edge and the second side peripheral edge is in contact with the second outer peripheral edge; in the second position, the first side peripheral edge is spaced from the first outer peripheral edge and the second side peripheral edge is spaced from the second outer peripheral edge;
   a display screen, the display screen being positioned on the side of the main bearing plate on which the first lateral surface is positioned, and being fixedly connected with the first, second and third side peripheral edges;
   a rear cover, the rear cover being positioned on the side of the main bearing plate on which the second lateral surface is positioned, and being fixedly connected with the first, second and third side peripheral edges; and
   a camera assembly arranged on the auxiliary bearing plate, in the first position, the camera assembly being hidden in the mobile phone, and in the second position, the camera assembly being exposed.

2. The mobile phone of claim 1, wherein a telephone receiver is arranged on the auxiliary bearing plate, a telephone receiver slot being formed in the third outer peripheral edge; when the auxiliary bearing plate is in the first position, the telephone receiver slot is partially exposed to enable the telephone receiver to transmit sounds to the outside through the telephone receiver slot.

3. The mobile phone of claim 2, wherein the third outer peripheral edge comprises a top surface, an outer surface and an inner surface, the inner surface being connected between the top surface and the first lateral surface of the auxiliary bearing plate, a first boundary of the telephone receiver slot being arc-shaped, a middle part of the first boundary being flush with an intersection line of the top surface and the outer surface, two ends of the first boundary being positioned on the top surface, a second boundary of the telephone receiver slot being flush with the first lateral surface of the auxiliary bearing plate; when the auxiliary bearing plate is in the first position, the top surface of the third outer peripheral edge is partially covered by the edge of the display screen and the middle part of the first boundary of the telephone receiver slot is exposed.

4. The mobile phone of claim 1, wherein a buffer edge is arranged at the edge of on the display screen fixedly connected with the first, second and third side peripheral edges, hardness of the buffer edge being lower than hardness of a cover plate of the display screen.

5. The mobile phone of claim 1, wherein the camera assembly comprises a front camera, an orientation of a light entering surface of the front camera being the same as an orientation of the display screen.

6. The mobile phone of claim 5, wherein the camera assembly further comprises a rear camera, an orientation of a light entering surface of the rear camera being opposite to the orientation of the display screen.

7. The mobile phone of claim 6, wherein positions of the rear camera and the first camera on the auxiliary bearing plate are mutually staggered.

8. The mobile phone of claim 1, wherein the camera assembly comprises a rear camera; a thickness of the third outer peripheral edge, on the side of the auxiliary bearing plate on which the second lateral surface is positioned, is gradually increased from joints with the first and second outer peripheral edges to a middle part of the third outer peripheral edge respectively; a matched arc-shaped notch is correspondingly formed in the rear cover, the rear camera being positioned on the auxiliary bearing plate and corresponding to the middle part of the third outer peripheral edge, and the rear camera being exposed from the arc-shaped notch in the second position.

9. The mobile phone of claim 1, further comprising a flash lamp, wherein the thickness of the third outer peripheral edge, on the side of the auxiliary bearing plate on which the second lateral surface is positioned, is gradually increased from the joints with the first and second outer peripheral edges to a middle part of the third outer peripheral edge respectively; a matched arc-shaped notch is correspondingly formed in the rear cover, the flash lamp being positioned at a position on the auxiliary bearing plate on the side on which the second lateral surface is positioned, and corresponding to a maximum thickness of the third outer peripheral edge, and the flash lamp being able to be exposed from the arc-shaped notch in the second position.

10. The mobile phone of claim 1, wherein the camera assembly comprises a rear camera, a thickness of a middle part of the third outer peripheral edge, on the side of the auxiliary bearing plate on which the second lateral surface is positioned, is larger than thicknesses of two end parts, and the rear camera being positioned on the auxiliary bearing plate and corresponding to the middle part of the third outer peripheral edge.

11. The mobile phone of claim 10, wherein the thickness of the third outer peripheral edge, on the side of the auxiliary bearing plate on which the second lateral surface is positioned, is gradually decreased from the middle part to the two end parts.

12. The mobile phone of claim 10, wherein a matched arc-shaped notch is formed in the rear cover and corresponds to a thickness difference of the third outer peripheral edge on the side of the auxiliary bearing plate on which the second lateral surface is positioned, the rear camera being exposed from the arc-shaped notch in the second position.

13. The mobile phone of claim 1, further comprising a rotating block rotatablely arranged on the auxiliary bearing plate, wherein the camera assembly is arranged on the rotating block.

14. The mobile phone of claim 1, wherein the camera assembly further comprises a face recognition component.

15. The mobile phone of claim 1, further comprising an ambient light sensor, wherein a protective cover plate is arranged on the auxiliary bearing plate, the protective cover plate being a transparent cover plate and covering the ambient light sensor and the camera assembly, a edge of the protective cover plate contacting with the first side peripheral edge, the second side peripheral edge and the third side peripheral edge.

16. The mobile phone of claim 1, further comprising a flash lamp, wherein a protective cover plate is arranged on the auxiliary bearing plate, the protective cover plate being a transparent cover plate and covering the flash lamp and the camera assembly, the edge of the protective cover plate contacting with the first side peripheral edge, the second side peripheral edge and the third side peripheral edge.

17. The mobile phone of claim 1, wherein, when the second middle frame of the middle frame member is in the first position relative to the first middle frame, a ratio of a display area of the display screen to an area of an outer contour of the middle frame member is more than or equal to 83%.

18. A mobile phone, comprising:
a middle frame member having a first lateral surface and a second lateral surface arranged opposite to each other, the middle frame member comprising a first middle frame and a second middle frame which are slideably arranged relative to each other, the first middle frame having a main bearing plate, the second middle frame having an auxiliary bearing plate, the auxiliary bearing plate having a first position and a second position relative to the main bearing plate,
a display screen, the display screen being positioned on the side of the main bearing plate on which the first lateral surface is positioned,
a rear cover, the rear cover being positioned on the side of the main bearing plate on which the second lateral surface is positioned,
a rotating block rotatablely arranged on the auxiliary bearing plate; in the first position of the auxiliary bearing plate, the rotating block is not able to rotate relative to the auxiliary bearing plate; in the second position of the auxiliary bearing plate, the rotating block is able to rotate relative to the auxiliary bearing plate,
a camera assembly arranged on the rotating block on the auxiliary bearing plate; in the first position of the auxiliary bearing plate, the camera assembly is hidden in the mobile phone, and in the second position, the camera assembly being exposed.

19. The mobile phone of claim 18, further comprising a motor, wherein a gear is arranged on an output shaft of the motor, a rack being arranged on the auxiliary bearing plate, the rack cooperating with the gear to allow the auxiliary bearing plate to be switched between the first position and the second position relative to the main bearing plate by the motor.

20. The mobile phone of claim 18, further comprising a motor, a gearbox, a screw rod and a sliding rod, wherein an output shaft of the gearbox is parallel to a moving direction of the auxiliary bearing plate, the gearbox comprising at least two gears which are mutually meshed, the gearbox being connected between the motor and the screw rod to enable the motor to drive the screw rod into rotation, a helical groove being formed in the screw rod, the sliding rod being connected with the auxiliary bearing plate and provided with a snap ring cooperating with the helical groove, and the screw rod being rotated to drive the sliding rod to move so as to switch the auxiliary bearing plate between the first position and the second position relative to the main bearing plate.

* * * * *